United States Patent
Hogan

(12) 
(10) Patent No.: US 6,252,961 B1
(45) Date of Patent: *Jun. 26, 2001

(54) METHOD AND APPARATUS FOR PERFORMING DATA ENCRYPTION AND ERROR CODE CORRECTION

(75) Inventor: Josh N. Hogan, Los Altos, CA (US)

(73) Assignee: Hewlett-Packard Co, Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/053,972

(22) Filed: Apr. 2, 1998

Related U.S. Application Data

(63) Continuation-in-part of application No. 08/896,002, filed on Jul. 17, 1997, now Pat. No. 6,047,069.

(51) Int. Cl.⁷ .............. H04L 9/08; G06F 12/14; H03M 13/00
(52) U.S. Cl. .............. 380/37; 713/189; 714/758; 380/44
(58) Field of Search .............. 380/205, 252–254, 380/37, 44, 45, 46, 216, 217, 269; 713/181, 189; 714/758, 752, 746, 763, 800

(56) References Cited

U.S. PATENT DOCUMENTS

| 4,637,023 | * | 1/1987 | Lounsbury et al. | 714/54 |
| 4,754,482 | * | 6/1988 | Weiss | 713/181 |
| 4,768,106 | * | 8/1988 | Ito et al. | 386/56 |
| 4,788,685 | * | 11/1988 | Sako et al. | 714/756 |
| 4,833,679 | * | 5/1989 | Anderson et al. | 714/758 |
| 5,293,388 | * | 3/1994 | Monroe et al. | 714/752 |
| 5,412,667 | * | 5/1995 | Havemose | 714/756 |
| 5,825,879 | * | 10/1998 | Davis | 380/216 |

* cited by examiner

Primary Examiner—Gilberto Barron, Jr.
Assistant Examiner—Anthony DiLorenzo

(57) ABSTRACT

A drive such as a DVD-ROM drive encrypts an error code correction (ECC) block in a manner that still retains the error correction capabilities of the ECC block. Encryption is performed by generating an encryption mask including a plurality of random numbers and redundancy data. The encryption mask is bitwise XOR'ed with the ECC block. The product of the bitwise XOR is an encrypted ECC block, which can then be transmitted over an unsecured bus to a host processor. The integrity of the ECC codewords is preserved. This allows the host processor to perform some or all error correction on the encrypted ECC block. Error correction can be removed from the drive altogether, or error correction can be performed by the drive and additionally by the host processor, if necessary. User data in the ECC block can be XOR'ed entirely with random numbers, or the user data can be XOR'ed selectively with random numbers and zeros to selectively encrypt a portion of the user data. Portions of the ECC block XOR'ed with zeros or not XOR'ed at all are not encrypted. If the encrypted data is not required downstream, it is left unencrypted or it is discarded. If the encrypted data is required downstream by an entity such as a trusted decoder, information needed to decrypt the data is transmitted in a secure manner to that entity.

23 Claims, 6 Drawing Sheets

∧ = EXCLUSIVE OR

METHOD AND APPARATUS FOR PERFORMING DATA ENCRYPTION AND ERROR CODE CORRECTION

CROSS-REFERENCE TO RELATED APPLICATIONS

This is a continuation-in-part of Ser. No. 08/896,002 filed Jul. 17, 1997, which issued as U.S. Pat. No. 6,047,069 on Apr. 4, 2000.

BACKGROUND OF THE INVENTION

The invention relates generally to data storage and transmission. More particularly, the invention relates to the encryption of data that includes codewords used for forward error correction.

Forward error correction is commonly performed in data transmission channels and data storage devices in order to maintain the integrity of user data. Redundancy data is added to the user data prior to transmission or storage. In data storage devices such as hard disk drives, compact disk (CD) players and Digital Video Disk (DVD) players, errors can occur due to defects in the storage medium and noise in the read channels. If an error is detected in the transmitted or stored data, the redundancy data allows the error to be corrected.

There are various methods of performing forward error correction. For instance, Reed-Solomon Product Code ("RS-PC") is used in CD and DVD players.

The CD and DVD players include error correction circuits for performing the forward error correction. The error correction circuits are computationally intensive and are typically implemented in a hardwired or inflexible manner. Additionally, the error correction circuits tend to be expensive in processing circuitry and high-speed memory.

Recent increases in processing power of personal computers will make it practical to perform full or partial forward error correction in the computer's host processor instead of the data storage device. Allowing the host processor to perform error correction would allow for more flexible error correction methods to be utilized. For example, the host processor could execute a default routine that is fast and that could correct a large majority of errors. Errors that could not be corrected by the default routine would be corrected by a more complex routine, such as a "heroic data recovery" routine. Heroic recovery is especially valuable in connection with long term storage of data. Hardcopies of valuable data might be destroyed following storage on a storage medium (e.g., a platter of a hard drive or a CD). In the months and years following the storage, long-term degradation of the storage medium might occur. A typical error correction circuit in a storage device might not be able to recover all of the data from the degraded storage medium. If such data cannot be recovered, it might be lost forever. The host processor, however, is more likely to recover the data using heroic data recovery routines.

The task of performing error correction could be shifted entirely or partially to the host processor. Consequently, the cost of the storage device could be reduced. The decoder circuit could be reduced or eliminated and expensive static random access memory (RAM) could be reduced in size.

In the alternative, the task of performing error correction could be divided between the host processor and the error correction circuit in the storage device. The task of correcting errors would fall initially on the error correction circuit, which would utilize a simple error correction algorithm that identifies and corrects the majority of errors. In the event the error correction circuit could not correct a data block, the task would be shifted to the host processor, which would use a more complex error correction routine. Such flexibility would allow for a fast, inexpensive error correction circuit to be used by the storage device. Consequently, the cost of the storage device would be lowered and the reliability of performing error correction would be improved.

However, there can be problems associated with performing the error correction in the host processor, especially after data encryption has been performed on data including error code correction ("ECC") codewords. If the ECC codewords are encrypted, the integrity of the codewords is typically destroyed. Consequently, errors in the data cannot be corrected by the host processor.

Yet there is an increasing pressure in the industry to encrypt the data before the data is sent from the storage device to the host processor. This is especially true for DVD-ROM drives on computers. Data is sent from a DVD-ROM drive to a DVD decoder card over a computer bus, which is not secure. There is a genuine concern that unencrypted data placed on the bus could be intercepted, and unauthorized copies of high quality movies, music, and proprietary data could be made. If unencrypted data were sent to the host processor for error correction, it would be vulnerable to theft and unauthorized copying. Therefore, the data is not error code corrected in the host processor. Instead, error code correction is performed on the data in the DVD-ROM drive. The error code corrected data is then encrypted before being sent to the DVD decoder card via the unsecured computer bus.

Thus far, the host processor has been precluded from performing error correction due to the need for secure transmissions over the computer bus. Consequently, the cost of the DVD-ROM drive has not been reduced by eliminating the expensive decoder and reducing expensive RAM for performing error correction. Additionally, the flexibility of performing different error correction routines has not been available.

SUMMARY OF THE INVENTION

The present invention allows partial or full data encryption to be performed in the drive and partial or full error correction to be performed by the host processor. A block of ECC-encoded data is read. The ECC block includes error correction codewords. An encryption mask is provided and bitwise XOR'ed with the ECC block. The product of the bitwise XOR is an encrypted ECC block, which can then be transmitted to the host processor. The integrity of the codewords is preserved. This allows the host processor to perform some or all error correction on encrypted ECC block.

User data in the ECC block can be XOR'ed entirely with numbers in the encryption mask, or the user data can be XOR'ed selectively with numbers in the encryption mask. Portions of the ECC block XOR'ed with zeros or not XOR'ed at all are not encrypted.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
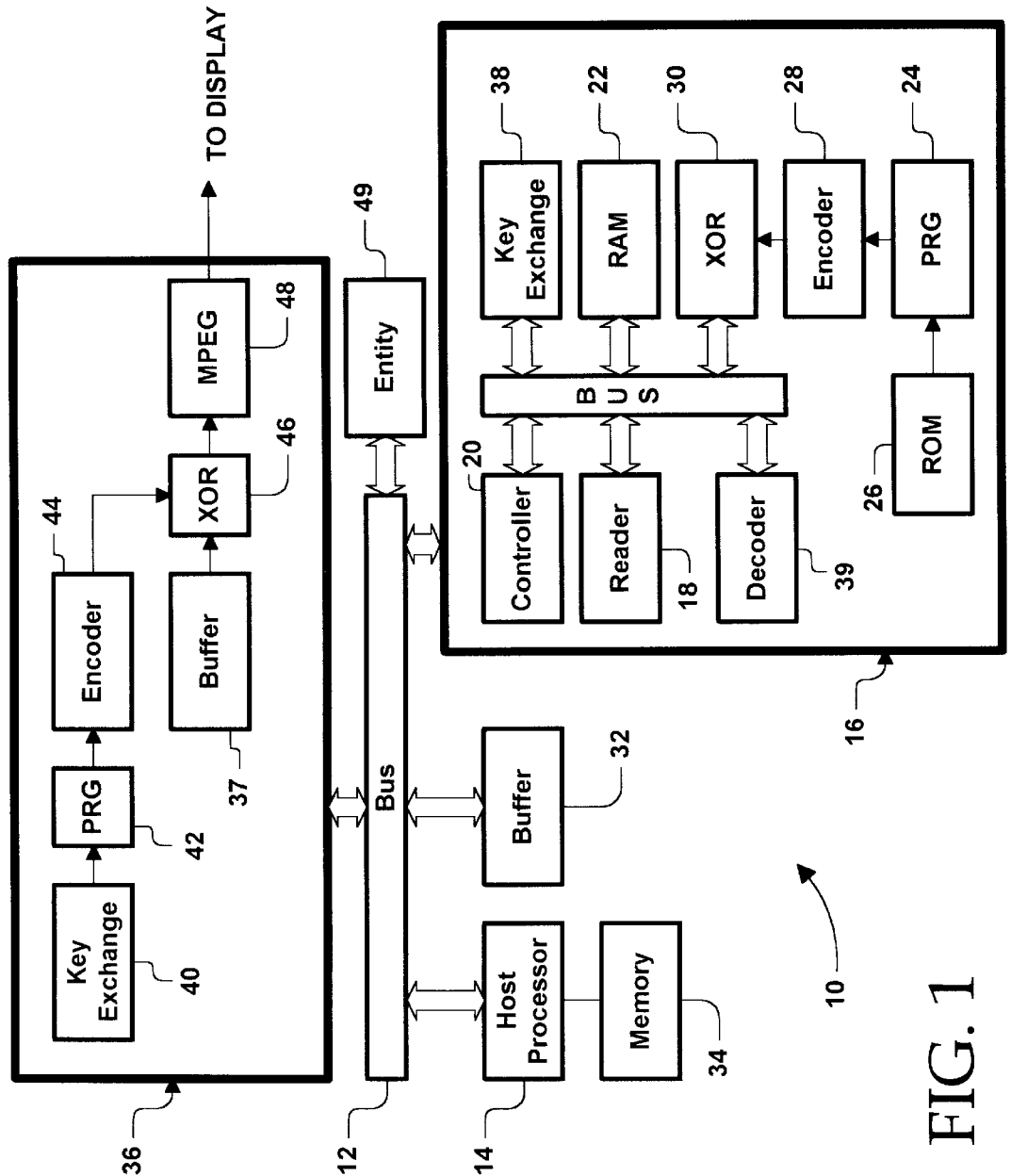
FIG. 1 is a block schematic diagram of various components of a computer system according to the present invention.

As shown in the drawings for purposes of illustration, the invention is embodied in a system including a host processor and a storage device that reads data from a storage medium (e.g., a compact disc or DVD disc). The data includes ECC codewords. The storage device performs data encryption on the data read from the storage medium, but preserves the integrity of error correction codewords. This allows the encrypted data to be transmitted to the host processor over an unsecure computer bus. The host processor can then perform error correction on the encrypted data. Afterwards, decryption can be performed by a trusted entity. Thus, the invention allows partial or full error correction of ECC codewords to be performed by a host computer without the danger of exposing confidential data on an unsecured computer bus.

In the paragraphs that follow, the invention will be described in connection with a computer system including a DVD-ROM drive and associated DVD-ROM electronics. It is understood that the invention is not limited to a DVD-ROM drive, and that the DVD-ROM is mentioned merely to facilitate an understanding of the invention.

FIG. 1 shows various components of a computer system 10. The computer system 10 includes a computer bus 12 and a host processor 14 (e.g., a central processing unit) connected to the computer bus 12. The system 10 further includes a DVD-ROM drive 16 including a DVD-ROM reader 18 that is operable to read RS-PC blocks stored on a DVD-ROM disc. RS-PC blocks are read from the DVD disc and, under control of a controller 20, buffered in random access memory (RAM) 22.

Figure 6:
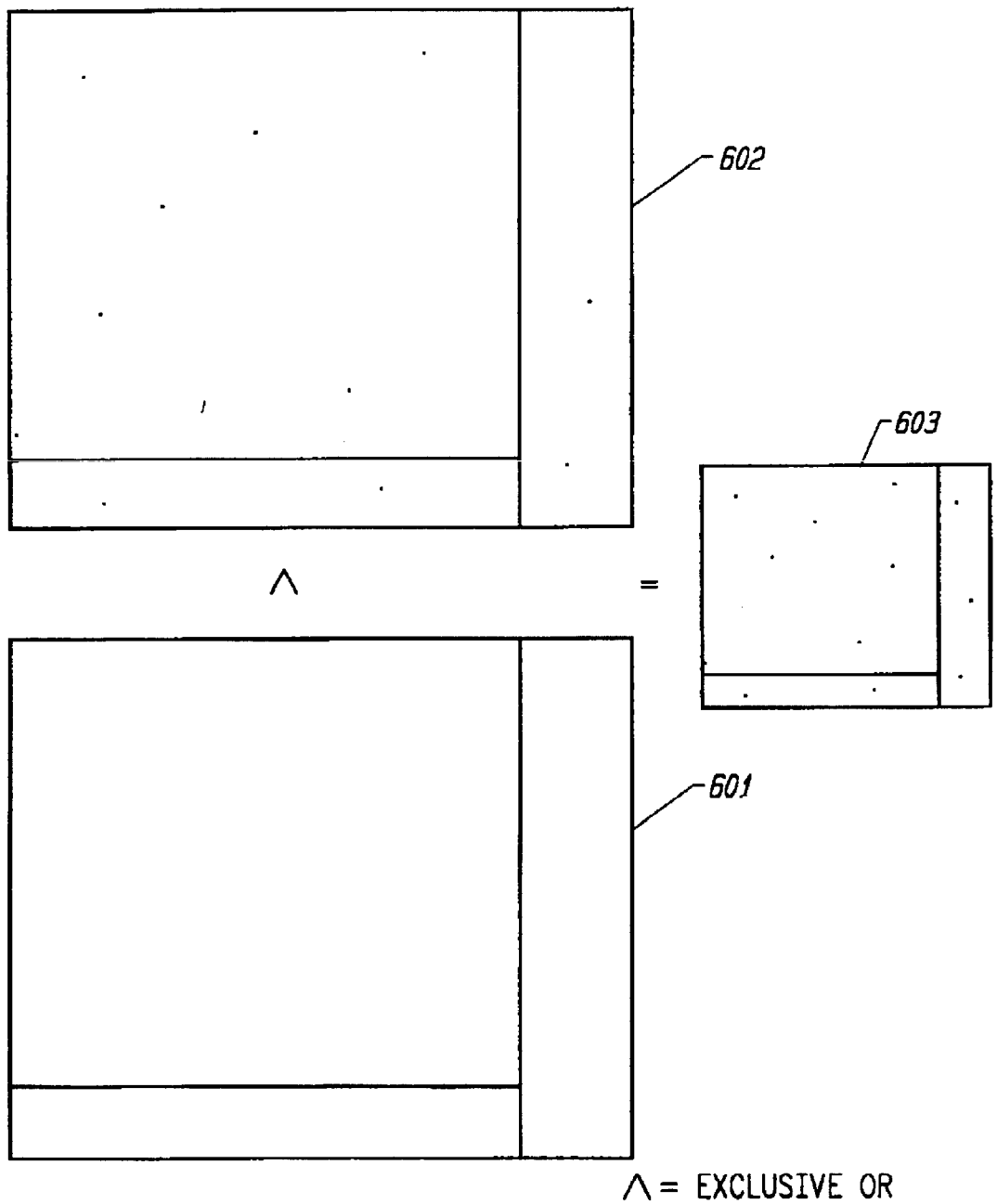
FIG. 6 is a block diagram showing an RS-PC block, an encryption mask, and a product of a bitwise XOR of the RS-PC block and the encryption mask.

Each RS-PC block includes M rows of user data, with each word of user data being N-bytes long. Appended to each of the M words is RS-PC redundancy data having a length of p-bytes. Thus, each row in the RS-PC block has (N+p) bytes, whereby the RS-PC block has (N+p) columns. Appended to each of the (N+p) columns is RS-PC redundancy data having a length of q-bytes. Resulting is an RS-PC block having (M+q)×(N+p) bytes. Such an RS-PC block 602 is shown in FIG. 6.

The DVD-ROM drive 16 does not need to perform error-code correction on the buffered RS-PC blocks. Instead, the DVD-ROM drive 16 performs encryption on the buffered RS-PC blocks. A first pseudorandom generator 24 generates an M×N block of random numbers, each number having a length of one byte. The random numbers may, for example, be generated from a seed that is accessed from a ROM module 26.

The M×N block of random numbers is supplied to an RS-PC encoder 28, which performs RS-PC encoding on the M×N block. An output of the encoder 28 provides an encryption mask having (M+q)×(N+p) bytes. The encoder 28, which includes a plurality of linear feedback shift registers, is relatively simple and inexpensive to implement. Additionally, the RS-PC encoding can be performed relatively quickly. The encoder 28 uses the same algorithm that was used for generating the codewords stored on the DVD disc.

Figure 3:
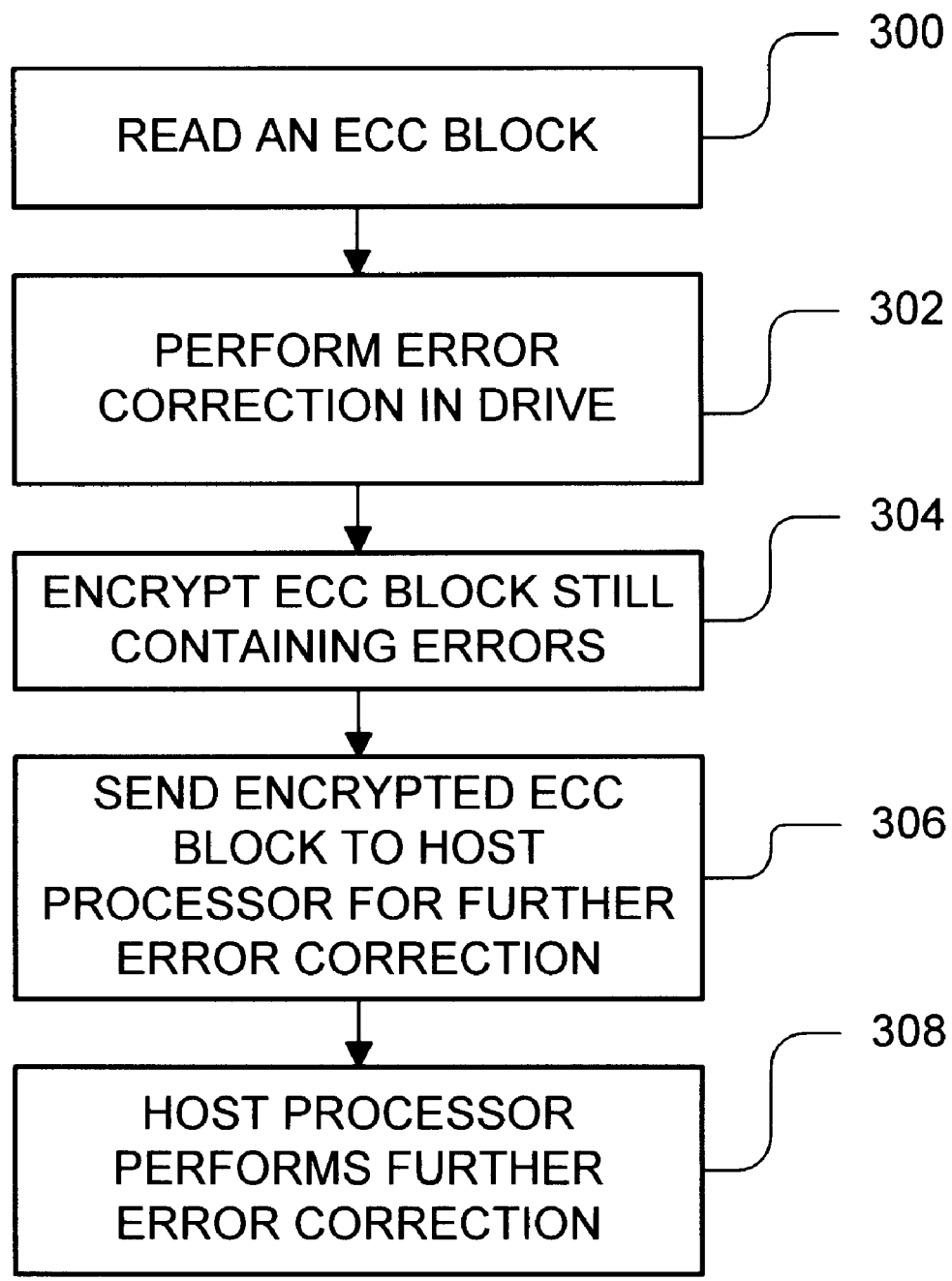
FIG. 3 is a flowchart of an alternative method of performing error code correction and data encryption according to the invention.

An XOR circuit 30 performs a bitwise exclusive OR (XOR) of the RS-PC block and the encryption mask. A bitwise XOR operation is illustrated in FIG. 3 and discussed below. Resulting from the bitwise XOR is an (M+q)×(N+p) encrypted block including encrypted user data and encrypted RS-PC redundancy data.

Under the control of the controller 20, the encrypted block is placed on the computer bus 12 and stored in a buffer 32 for error correction. Even though the computer bus 12 is unsecured, the user data in the encryption block is encrypted and, therefore, protected. Thus, the user data is not made readily available to bus sniffer devices such as storage scopes and data analyzers that could analyze data transferred across the computer bus 12.

The host processor 14 is instructed to perform error correction by executable instructions store in memory 34. While the instructions are being executed by the host processor 14, the host processor 14 performs RS-PC correction on the encrypted data block stored in the buffer 32.

The host processor 14 sends the still encrypted, but now error-corrected, (M+q)×(N+p) block to a DVD decoder card 36 via the computer bus 12. The encrypted block is received and stored in a buffer 37 on the DVD decoder card 36. If the DVD decoder card 36 performs decryption on the encrypted block, it accesses the seed stored in the ROM 26, that is, the seed from which the encryption mask was generated. Modules 38 and 40 perform authentication and exchange of the seed between the DVD-ROM drive 16 and the DVD decoder card 36. Authentication and exchange can be performed in a conventional manner.

A second pseudorandom generator 42 on the DVD decoder card 36 generates the same sequence of random numbers generated by the first pseudorandom generator 24, and a second encoder 44 generates an M×N decryption mask from the random numbers. The decryption mask is identical to the M×N block of random numbers in the encryption mask. Thus, the decryption mask is generated by sending a minimum amount of data (i.e., the seed) via the authentication and exchange modules 38 and 40.

A second XOR circuit 46 then performs a bitwise XOR of the decryption mask and the M×N user data in the encrypted block stored in the buffer 37. The product of the bitwise XOR is an unencrypted M×N block of user data.

The DVD decoder card 36 also includes a Moving Pictures Experts Group (MPEG) decoder 48 which receives the RS-PC block and decodes the M×N byte block of decrypted user data according to an MPEG standard. The MPEG decoder 48 outputs a stream of uncompressed data, which is displayed on a video display. The uncompressed data is sent directly to the display or display memory. The uncompressed data is not transmitted on the computer bus 12.

The error-corrected encrypted block can be received by other entities 49 downstream the host processor 14. A downstream entity 49 could regenerate the encrypted block for subsequent data transmission. Encrypted data that is not accessed by the downstream entity 49 can be discarded by the downstream entity 49. If a downstream entity 49 is not allowed access to the data in the encrypted block, the seed is not sent to that downstream entity 49.

The drive 16 might also have basic error correction capability. For example, the drive could include a decoder 39 for performing on-the-fly error correction. If the decoder 39 cannot correct a data block, the data block is sent to the host processor 14. Such flexibility would allow a fast, inexpensive decoder 39 to be used for error correction. Such flexibility would also allow for more complex, more accurate error correction to be performed by the host processor 14.

Figure 4:
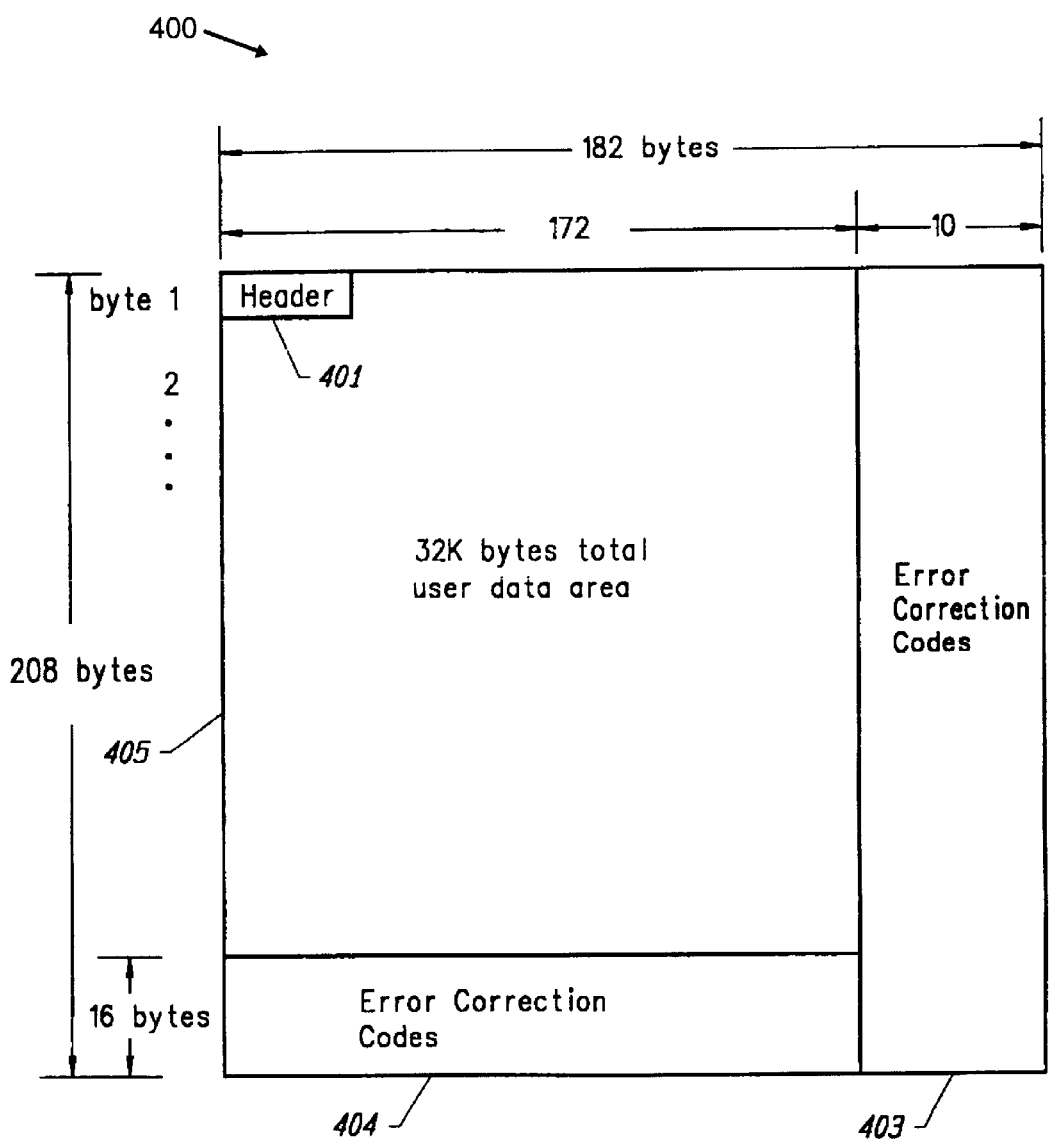
FIG. 4 illustrates a simplified layout of an RS-PC block.
Figure 5:
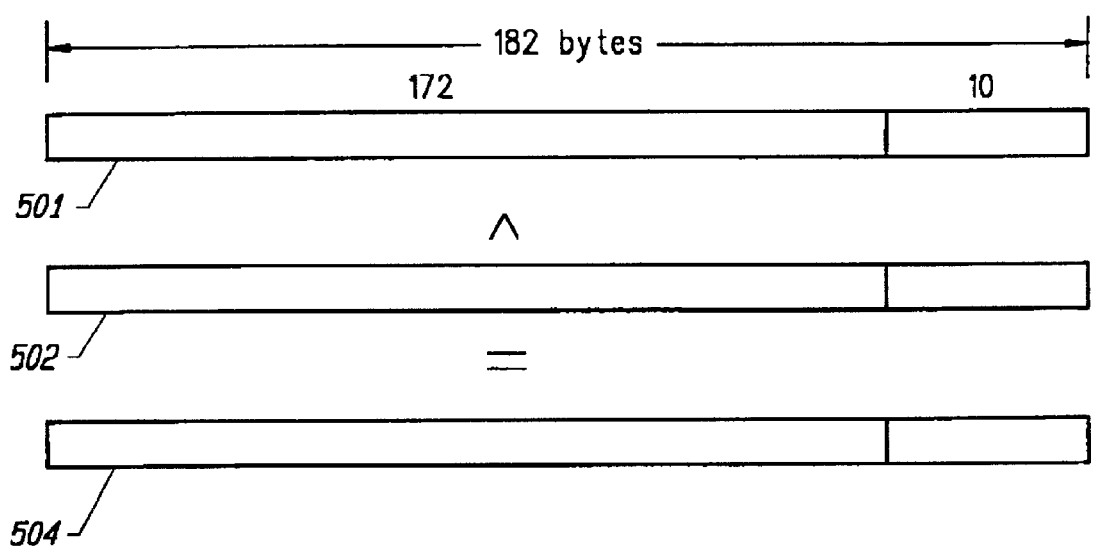
FIG. 5 illustrates a bitwise XOR operation performed by the computer system.

FIGS. 4 to 6 show the bitwise XOR operation in greater detail FIG. 4 shows a simplified version of an RS-PC block 400. The M×N block 405 of user data is 32K bytes. RS-PC redundancy data 403, 404 is associated with each row and each column in the block 400. The length of the RS-PC block 400 is 182 bytes, of which 172 bytes are user data 405. The remaining ten bytes are RS-PC redundancy data 403 that are added for error recovery. The number of rows in the RS-PC block 400 is 208 with sixteen rows including RS-PC redundancy data 404. A header 401 contains information relating to copy protection, in particular, an encryption key. Under normal circumstances the user receives this data and never needs to know the contents of the header 401 or the RS-PC redundancy data 403 and 404. That information is extracted and checked while the data is in the drive. The M×N block 405 of user data might also include a lead-in area (not shown) that contains highly confidential data.

Referring to FIG. 5, a row 501 of an RS-PC block includes 172 bytes of user data and tens bytes of RS-PC redundancy data that is created from the user data in the row 501. A row 502 of an encryption mask includes 172 bytes of random numbers and ten bytes of RS-PC redundancy data that is created from the 172 bytes of random numbers in the row 502. When the two rows 501 and 502 are bitwise XOR-ed together, a row 504 of an encrypted block is formed. The row 504 of the encrypted block includes 172 bytes of encrypted data and ten bytes of redundancy data, which provides a valid RS-PC codeword for the 172 bytes of encrypted data in the row 504. Decryption is performed by XOR'ing the row 504 of the encrypted block with the row 502 of the encryption mask.

The bitwise XOR operation can be extended to cover entire blocks. The length of the seed stored in the ROM 26 for the first pseudorandom number generator 24 is long enough to ensure the required cryptographic strength. Once the 32K byte are of random numbers is created, the associated RS-PC redundancy data are then calculated to complete the encryption mask. Because calculating the RS-PC redundancy data is a relatively trivial matter, little processing power is needed to calculate the RS-PC redundancy data.

As a result of the foregoing operations, the error correction capability of the RS-PC codewords is preserved. Referring to FIG. 6, noise and defects in the storage media introduce errors that are scattered throughout the original RS-PC block 602. The errors are indicated by dots. The encryption mask 601 does not contain errors. When the encryption mask 601 and the RS-PC block 602 are XOR-ed, the integrity of the error correction capability is maintained. Thus, the encrypted data block 603 contains errors in the same locations as the RS-PC block 602 and the RS-PC codewords are all consistent so that error correction can be successfully performed. Even if there were errors in the encryption mask 601, errors could still be corrected and the encryption and subsequent error correction would operate satisfactorily.

The processing power required by the pseudorandom number generators 24, 42 and the RS-PC encoder 28 is not significant when compared to the processing power required to perform error code correction. The invention, therefore, imposes only a small burden on the DVD-ROM drive 16 and DVD decoder card 36, while removing the larger burden of performing error code correction. Error code correction can be shared between the DVD-ROM drive 16 and the host processor 14 or left entirely to the host processor 14.

The basic steps of the invention are as follows:
1) A seed is provided. The length of the seed is long enough to ensure the required cryptographic strength.
2) A block of random numbers is generated by a pseudorandom number generator, which is seeded or initialized by the seed.
3) Error correction codewords are generated according to the same error correction code generation scheme as was used for the RS-PC block stored on the storage medium. In this way, a sequence of codewords is generated, all of which are determined by the random number seed and which are consistent with the original block stored on the storage medium. Resulting is an encryption mask.
4) A bitwise XOR is performed between the original RS-PC block and the encryption mask.
5) The block resulting from the bitwise XOR operation also includes valid codewords which contain any errors contained in the codewords read from the storage medium. No additional errors are introduced because the encryption mask does not contain any errors. The block resulting from the bitwise XOR operation is effectively encrypted and can be sent to the host processor or other processing entity for error correction without risk of unauthorized copying of the original data.
6) Error code correction is performed by the host processor. An error-corrected, but still encrypted block is sent downstream the host processor without risk of unauthorized copying of the original data.
7) If decryption is performed by a trusted entity (e.g., an MPEG decoder) downstream the host processor, only the seed need be transferred to the trusted entity. The seed can be transferred in a secure manner using a key that is authenticated and exchanged in accordance with standard techniques. The trusted entity then generates a decryption mask using the same random number pattern used by the encryption mask for encryption of the user data. The decryption mask is bitwise XOR-ed with the user data of the error corrected, but still encrypted data block. Resulting is an M×N block of decrypted, error-code corrected user data.
8) If an entity downstream the host processor does not perform decryption on the block, the seed is not transferred to that entity. Similarly, if an entity downstream the host processor is not allowed access to the data in the block, the seed is not sent to that entity.

Thus far, the invention has been described in connection with encryption of an entire RS-PC block. However, situations might arise where it is not necessary to encrypt the entire RS-PC block. Only a portion of the RS-PC block might need to be encrypted. For example, a portion of the lead-in area might contain confidential data relating to encryption. However, the initial bytes of the 172×192 block of user data (i.e., the header) contains address and other header information that are not confidential. Therefore encryption mask bytes corresponding to the header are all zeroes, and the remaining bytes are pseudo random numbers. This allows the host processor 14 to error-correct and confirm the block address, but not to have access to the confidential data, (which it sends to the DVD decoder card 36). Thus, portions of the RS-PC block are selectively encrypted, thereby protecting the confidentiality of the data from the host processor 14 and perhaps other entities 49 downstream the host processor 14.

In another example, an ECC block read from the storage medium already contains encrypted information in certain areas. Therefore, the data that is already encrypted is not in danger of being exposed on the computer bus and, therefore, does not have to be further encrypted by the drive. However, the ECC block also contains highly confidential, title key data in the header area. Additional header information, such as the address, is not confidential. In this case, only the confidential data in the header needs to be protected. Therefore, the encryption mask contains all zeroes everywhere except at the confidential header data byte locations (which contain pseudo random numbers). This allows the host processor to error correct the ECC block, verify the address and pass on the user data, without gaining access to the confidential information.

Figure 2:
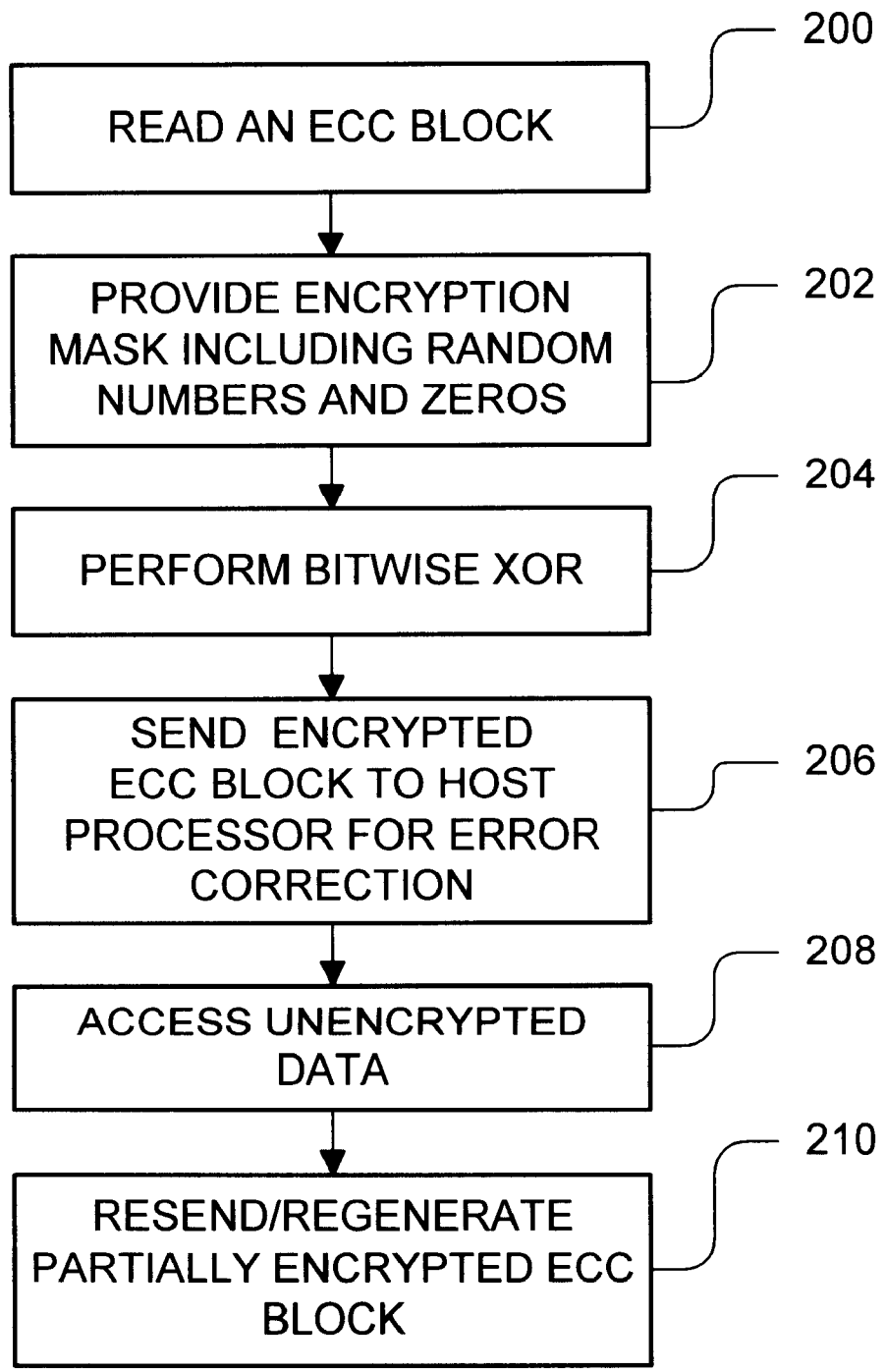
FIG. 2 is flowchart of a method of performing error code correction and data encryption according to the invention.

FIG. 2 shows a method of selectively encrypting data in an ECC block. An ECC block is read from a storage medium (block 200). If only a portion of the data in the ECC block (e.g., a byte sequence) needs to be kept confidential, the drive (e.g., a CD ROM or DVD drive) provides an encryption mask including random numbers corresponding to the locations containing confidential data and zeroes elsewhere (block 202). The locations of the zeroes in the encryption mask can be determined by convention. For example, if by convention, the header information is to be protected, the encryption mask will contain random numbers at the header locations and zeroes elsewhere. The encryption mask also includes ECC redundancy data for the random numbers and zeros.

Next, the encryption mask block is bitwise XOR'ed with the ECC block (block 204). The partially-encrypted block that results includes valid ECC codewords, encrypted data at the header location, and unencrypted data elsewhere.

The partially-encrypted block is sent to the host processor, which performs error code correction (block 206). Additionally, the host processor accesses the unencrypted information (block 208).

The error-corrected block is then sent to one or more additional entities (block 210). At each entity a random data sequence may either be reused for processing subsequent data, or a new random data sequence may be generated for each quantity of data to be processed. Additional encryption, either full or partial, by each additional entity would add additional layers of protection. It would also allow selected data to be made available to selected entities. The corrected non-confidential data would be available for immediate use. Seeds would not be sent to entities not performing decryption or not having access to the confidential data.

When generating the encryption mask, filling in the zeroes is not necessary. Instead, random numbers can be provided and the redundancy bytes can be generated from the random numbers and their locations. Selective portions of the ECC block can then be bitwise XOR'ed with the random numbers and the redundancy bytes.

FIG. 3 shows a method in which a drive performs basic ECC and the host processor performs more complex error correction. The drive reads an ECC block from a storage medium and buffers the ECC block (block 300). The drive includes a relatively simple circuit that performs a simple error correction algorithm for identifying and correcting the majority of errors in the buffered ECC block (block 302). In the event the error correction circuit cannot correct a data block, some or all of the buffered ECC block is encrypted (block 304) and sent to the host processor (block 306). The host processor then performs a more complex error correction routine to recover the errors (block 308). Such flexibility would allow for a fast, inexpensive error correction circuit to be used in the drive, which would lower the cost of the drive and improve the speed of performing error correction. Additionally, error correction capability would be improved. This is particularly important for long-term storage of data.

Thus disclosed is an invention in which ECC-encoded data is encrypted without affecting the integrity of the ECC codewords. The invention allows encrypted data to be error code corrected in the host processor and subsequently decrypted. Performing error code correction in the host processor, in turn, allows for the cost of the storage device to be lowered by reducing expensive ECC circuitry and reducing static RAM.

Another advantage of performing ECC in the host processor is that the host processor, unlike hardware, has the flexibility to utilize different ECC routines. Whereas a hardware circuit is typically restricted to using the same ECC algorithm or set of algorithms for all situations, the host processor can use different algorithms. For example, the host processor could analyze the entire ECC block without modifying (i.e., correcting) any data and then decide upon the best strategy to avoid miscorrection. Miscorrection of data can be a problem, especially during on-the-fly processing. A hardware RS-PC decoder typically performs error code correction on the fly and might miscorrect data and, consequently, increase the number of errors in the data block. Miscorrection further increases the likelihood of the block being uncorrectable. A more flexible approach adapted by the host processor could avoid this problem by analyzing the data and error patterns before making any modification to the data block.

Among other advantages, encryption and decryption are performed by sending only a minimal amount of confidential information—the seed—across the computer bus. The encryption mask is not exposed on the bus. Since the drive manufacturer of a drive such as a DVD-ROM drive will typically sell the decoder card as well, the drive manufacturer can specify matching same pseudorandom number generators on the drive and the decoder card.

The host processor can perform error code correction without having access to the encrypted data. In the alternative, selective encryption can be performed, in which case the host processor has access to only selected information. Corrected non-confidential data is immediately accessible for use.

Although the invention has been described in connection with a DVD-ROM drive, it is not so limited. The invention is especially applicable where forward error correction is needed, and where it is not practical for the sender to retransmit data. Data storage devices other than DVD players include CD players, Digital Data Storage (DDS) players, and Digital Video Cassette (DVC) players. Other applications include space and mobile communication devices. Thus, the source of the ECC blocks is not limited to a ROM drive.

Specific embodiments of the invention have been described and illustrated above. However, the invention is not limited to the specific forms or arrangements of parts so described and illustrated. For example, the invention can use error correction methods other than the Reed-Solomon Product Code. This, of course, will depend upon the encryption method used for the data stored on the storage medium.

Instead of generating a seed and an encryption mask, the DVD-ROM drive could access an apriori encryption mask from a ROM. The DVD-decoder card would also access the encryption mask from a ROM. In addition to reducing processing power, this embodiment would avoid the need for the DVD-ROM drive to pass the seed to the DVD decoder card.

Therefore, the invention is not limited to the specific embodiments described and illustrated above. Instead, the invention is construed according to the claims that follow.

What is claimed is:

1. A system comprising:
   a computer bus;
   a host processor connected to the computer bus, the host processor being programmed to perform error code correction; and
   a drive including means for providing a block of ECC-encoded data; means for providing a seed, a pseudo-random data generator for generating a sequence of random numbers from the seed, and an ECC encoder for generating an encryption mask including first and second portions, the first portion including the random numbers, the second portion including redundancy data for the first portion; and means for performing a bitwise XOR of the encryption mask and the block of ECC-encoded data, a product of the bitwise XOR being an encrypted block, an output of the bitwise XOR means being coupled to the computer bus.

2. The system of claim 1, further comprising means, coupled to the computer bus, for receiving the encrypted block from the host processor; means for receiving the seed from the drive; a second pseudorandom generator for generating a decryption mask from the seed; means for performing a second bitwise XOR of the decryption mask and user data in the encrypted block, a product of the second bitwise XOR providing unencrypted user data.

3. The system of claim 2, further comprising an MPEG decoder coupled to an output of the means for performing the second bitwise XOR.

4. The system of claim 3, wherein the drive is a DVD-ROM drive, and wherein a DVD decoder card includes the MPEG decoder, the means for receiving the encrypted block, the means for receiving the seed; the second pseudorandom generator and the means for performing the second bitwise XOR.

5. A system comprising:
   a computer bus;
   a host processor conneted to the computer bus, the host processor being programmed to perform error code correction; and
   a drive including means for providing a block of ECC-encoded data; means for providing an encryption mask; and means for performing a bitwise XOR of the encryption mask and the block of ECC-encoded data, a product of the bitwise XOR being an encrypted block, an output of the bitwise XOR means being coupled to the computer bus;
   wherein the ECC block includes a first portion for user data and a second portion for redundancy data, and wherein the encryption mask includes third and fourth portions corresponding to the first and second portions, respectively, of the ECC block.

6. The system of claim 5, wherein the third portion is filled with a plurality of numbers, and wherein the fourth portion includes redundancy data generated from the third portion.

7. The system of claim 6, wherein the third portion is filled selectively with a plurality of numbers, and wherein the fourth portion includes redundancy data generated from the third portion.

8. A system comprising:
   a computer bus;
   a host processor conneted to the computer bus, the host processor being programmed to perform error code correction; and
   a drive including means for providing a block of ECC-encoded data; means for providing an encryption mask; and means for performing a bitwise XOR of the encryption mask and the block of ECC-encoded data, a product of the bitwise XOR being an encrypted block, an output of the bitwise XOR means being coupled to the computer bus, whereby the encrypted block can be sent to the host processor via the computer bus for error code correction;
   wherein the ECC block is coded according to an error code correction method, and wherein the encryption mask is coded according to the same error code correction method.

9. A drive comprising:
   means for reading an ECC block from a storage medium;
   means for providing a seed;
   a pseudorandom data generator for generating a sequence of random numbers from the seed;
   means for generating an encryption mask including a sequence of random numbers and redundancy data, the random numbers being generated from the seed; and
   means for performing a bitwise XOR of the encryption mask and the ECC block, a product of the bitwise XOR being an encrypted ECC block.

10. The drive of claim 9, wherein the ECC block includes a first portion for user data and a second portion for redundancy data, and wherein the encryption mask includes a third and fourth portions corresponding to the first and second portions, respectively, of the ECC block.

11. The drive of claim 10, wherein the third portion is filled entirely with random numbers, and wherein the fourth portion includes redundancy data generated from the third portion.

12. The drive of claim 10, wherein the third portion is filled selectively with random numbers and zeros, and wherein the fourth portion includes redundancy data generated from the third portion.

13. The drive of claim 9, wherein the ECC block is coded according to an error code correction method, and wherein the encryption mask is coded according to the same error code correction method.

14. The drive of claim 9, further comprising means for performing error code correction on the ECC block.

15. A method of transmitting secured data over a bus, the method comprising:
   receiving an ECC block;
   generating an encryption mask including a plurality of numbers and redundancy data;
   performing a bitwise XOR of the encryption mask and the ECC block, a product of the bitwise XOR being an encrypted ECC block; and
   sending the encrypted ECC block over the bus.

16. The method of claim 15, further comprising the step of using the host processor to perform error code correction on the encrypted block.

17. The method of claim 15, further comprising the step of performing partial error-correction on the ECC block before performing the bitwise XOR and sending the encrypted block sent over the bus.

18. The method of claim 15, wherein the ECC block includes a first portion for user data and a second portion for redundancy data, and wherein the step of generating the encryption mask includes the steps of filling a first portion of the encryption mask entirely with random numbers, and filling a second portion of the encryption mask with redundancy data for the first portion, the first and second portions of the encryption mask corresponding to the first and second portions of the ECC block.

19. The method of claim 15, wherein the ECC block includes a first portion for user data and a second portion for redundancy data, and wherein the step of generating the encryption mask includes the steps of filling a first portion of the encryption mask selectively with numbers and zeros, and filling a second portion of the encryption mask with redundancy data generated from the numbers, the first and second portions of the encryption mask corresponding to the first and second portions of the ECC block.

20. The method of claim 15, further comprising the step of decrypting the encrypted block, the step of decrypting including generating a decryption mask; and performing a bitwise XOR of the decryption mask and user data in the encrypted ECC block, a product of the bitwise XOR providing unencrypted user data.

21. The method of claim 20, wherein the encryption mask is generated during encryption via a seed and a random number generator algorithm, and wherein the decryption mask is generated during decryption by using the same seed and the same random number generator algorithm.

22. The method of claim 15, further comprising the step of regenerating the encrypted block for subsequent data transmission.

23. The method of claim 15, further comprising the step of reusing the random data block for encryption of subsequent data blocks.

* * * * *